(12) United States Patent
Richter

(10) Patent No.: US 6,253,605 B1
(45) Date of Patent: Jul. 3, 2001

(54) SEMICONDUCTIVE FLOW PROPORTIONER

(75) Inventor: Martin Richter, München (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/403,640

(22) PCT Filed: Apr. 22, 1998

(86) PCT No.: PCT/EP98/02372

§ 371 Date: Oct. 22, 1999

§ 102(e) Date: Oct. 22, 1999

(87) PCT Pub. No.: WO98/48330

PCT Pub. Date: Oct. 29, 1998

(30) Foreign Application Priority Data

Apr. 22, 1997 (DE) .............................................. 197 16 897

(51) Int. Cl.⁷ ................................ G01F 5/00; G01F 1/38; G01F 1/22
(52) U.S. Cl. ...................... 73/203; 73/861.47; 73/861.58
(58) Field of Search ........................... 73/706, 708, 714, 73/721–727, 861.22, 861.23, 195, 198, 202, 203, 754, 755, 861.42, 861.47, 861.52, 861.58, 861.61

(56) References Cited

U.S. PATENT DOCUMENTS

| 4,330,003 | 5/1982 | D'Alonzo | 137/100 |
|---|---|---|---|
| 4,986,127 * | 1/1991 | Shimada et al. | 73/714 |
| 5,463,904 * | 11/1995 | Kalinoski | 73/861 |
| 5,469,749 | 11/1995 | Shimada et al. | 73/861.47 |
| 5,804,701 * | 9/1998 | Berger | 73/23.42 |

FOREIGN PATENT DOCUMENTS

| 1943021 | 9/1968 | (DE) | G01F/1/00 |
|---|---|---|---|
| 4223067 | 7/1992 | (DE) | F16K/7/00 |
| 4143343C2 | 9/1994 | (DE) | F04B/43/04 |
| 195 29396 | 8/1995 | (DE) | G01F/1/28 |
| 0239331 A2 | 9/1987 | (EP) | G05D/7/00 |
| 0239331B1 | 5/1992 | (EP) | G05D/16/16 |
| 2064826A | 6/1981 | (GB) | G05D/11/13 |
| 60127814 | 12/1986 | (JP) | H01L/29/84 |
| 02114279 | 1/1992 | (JP) | G01F/1/20 |
| 02286168 | 6/1992 | (JP) | G01F/1/28 |
| 6-229793 | 9/1994 | (JP) | G01F/1/28 |

* cited by examiner

Primary Examiner—William Oen
(74) Attorney, Agent, or Firm—Michael A. Glenn

(57) ABSTRACT

A proportioning element (10) for proportioning a fluid flow from an input side to an output side of the proportioning element (10) comprises a membrane (12) provided with at least one opening (16) acting as a flow resistor for a medium to be proportioned. The membrane (12) has additionally integrated therein a pressure sensor (14) used for detecting a pressure difference between the input side and the output side of the proportioning element (10). The proportioning element is implemented as a semiconductor chip, the membrane (12) being a semiconductor membrane and areas of the semiconductor chip which are exposed to the medium to be proportioned being provided with a passivation layer.

10 Claims, 1 Drawing Sheet

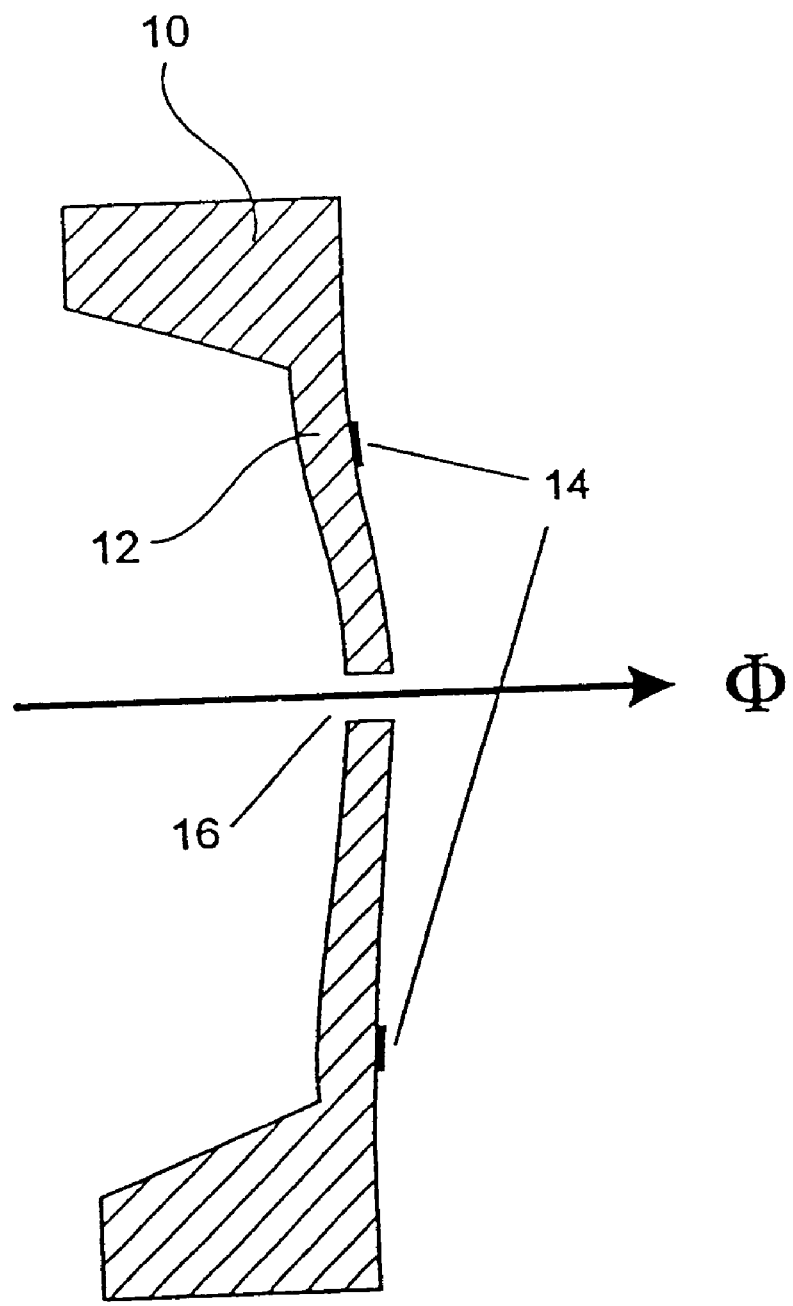
FIG.

SEMICONDUCTIVE FLOW PROPORTIONER

DESCRIPTION

The present invention relates to a proportioning element for proportioning a fluid flow from an input side to an output side of the proportioning element, the proportioning element being suitable to be used e.g. in a proportioner for dosing medicaments in the field of medical engineering.

In the field of medical engineering, proportioners are known, which comprise flow resistors whose flow rate depends on the pressure with which the medium to be proportioned is acted upon before the flow resistor, when seen in the direction of flow. For detecting the pressure difference, two different pressure sensors are normally used, the pressure sensors being arranged before and after the flow resistor, when seen in the direction of flow.

Known flow resistors consist e.g. of glass capillaries or microchannels in a capillary form. A disadvantage of such known proportioners is that they have a complicated structural design due to the fact that a flow resistor and two different pressure sensors, which arranged before and after the flow resistor when seen in the direction of flow, are required.

In the Patent Abstracts of Japan, P 1828, Nov. 18, 1994, Vol. 18, No. 609, a means for measuring a flow rate is described, in the case of which an elastic plate with an opening is arranged in a passage or in a tube through which fluid flows. Furthermore, means for detecting the deflection of the elastic plate are provided in the elastic plate.

DE 195 29 396 A1 discloses a measuring device for measuring the flow rate of a medium flowing in a flow cross-section, in the case of which a plate acted upon by the medium is flexible due to cuts formed therein, the plate having provided thereon strain gauges for detecting a deflection of the plate.

DE 42 23 067 C2 describes a micromechanical flow restrictor which is implemented in a multilayer structure. This flow restrictor is adapted to be used in combination with a micromechanical valve for micromechanical proportioners.

DE-AS-19 43 021 teaches that a means is used for measuring the flow through a tube according to the differential pressure flow metering method in the case of which an elastic deformation of a component depending on the pressure to be measured is converted into an electric signal. The strain gauges used for detecting the elastic deformation are directly attached to an elastic orifice plate which is arranged in the tube through which the fluid flows.

Starting from the above-mentioned prior art, it is the object of the present invention to provide a proportioning element which has a simple structural design and which permits exact proportioning of media, even if they are chemically aggressive.

This object is achieved by a proportioning element according to claim 1.

The present invention provides a proportioning element for proportioning a fluid flow from an input side to an output side of the proportioning element, which comprises a membrane provided with at least one opening acting as a flow resistor for a medium to be proportioned. The membrane has integrated therein pressure sensors used for detecting a pressure difference between the input side and the output side of the proportioning element. The proportioning element is implemented as a semiconductor chip, the membrane being a semiconductor membrane. Areas of the semiconductor chip which are exposed to the medium to be proportioned are covered with a passivation layer.

Preferably, the pressure sensor is defined by piezoresistive resistors arranged on or in the membrane. The semiconductor chip, which may consist e.g. of silicon, has in addition preferably integrated therein a temperature sensor.

A proportioner including a proportioning element according to the present invention can e.g. comprise a controllable pressure transducer and a control device for controlling the controllable pressure transducer in dependence upon the pressure difference detected by means of the pressure sensor and/or the temperature detected by means of the temperature sensor.

An alarm signalling device can be provided for outputting an alarm if flow passages arranged before and/or after the membrane have a leak or are clogged or if the at least one opening of the membrane is clogged; such malfunctions can be recognized on the basis of the pressure difference detected by the pressure sensor.

By means of the proportioning element according to the present invention chemically aggressive flow media can easily be proportioned. In comparison with known proportioners, the proportioning element according to the present invention is also advantageous insofar as the pressure difference is determined directly by means of a sensor instead of being determined by two pressure measurements relative to the atmosphere, the results of the two measurements being then subtracted from one another. Furthermore, the flow resistor, i.e. the restriction, according to the present invention is integrated directly in the pressure sensor. Hence, only a single chip is required, the chip fulfilling both the function of differential pressure measurement and the function of the flow resistor, i.e. the flow restricting function.

Further developments of the present invention are disclosed in the dependent claims.

In the following, a preferred embodiment of the present invention will be explained in detail, part of the explanation referring to the single figure enclosed.

The figure shows a schematic cross-sectional view of a proportioning element according to the present invention.

As can be seen in the figure, a proportioning chip, which is implemented as a piezoresistive pressure sensor with one or a plurality of holes in the pressure sensor membrane, serves as a proportioning element in the preferred embodiment of the present invention, the holes in the pressure sensor membrane serving as a flow resistor having a defined flow resistance.

In the figure, the proportioning chip, which is preferably defined by a semiconductor chip consisting e.g. of silicon, is designated generally by reference numeral 10. A membrane 12 is formed in the chip e.g. by conventional etching techniques. In the preferred embodiment, the membrane has arranged thereon four piezoresistive resistors 14, which are arranged in a Wheatstone bridge circuit and only two of which can be seen in the figure. Furthermore, the membrane has provided therein at least one opening 16 which serves as a flow resistor having a defined flow resistance. The opening 16 can be formed in the membrane 12 e.g. by means of conventional dry etching techniques.

In the embodiment shown in the figure, an overpressure is applied to the membrane 12 on the left-hand side thereof. This results in the deformation of the membrane which is shown in the figure and which can be detected by means of the piezoresistive resistors 14. This deformation is a measure of the overpressure applied to the membrane 12.

When such an overpressure is being applied, the medium to be proportioned, i.e. a liquid or a gas, will flow through the hole 16 or alternatively the holes, if a plurality of holes is provided in the membrane 12. As has been described, the membrane 12 is deflected due to the pressure drop, whereby the pressure difference across the flow resistor, which exists between the input side on the left-hand side of the figure and the output side on the right-hand side of the figure, can be detected.

The flow φ, which is indicated by the arrow in the figure and which flows through the flow resistor, is a function of the pressure applied to the flow resistor.

If the flow resistor, i.e. the flow restriction, consists of a hole whose diameter is much smaller than the length thereof, the relationship between flow and pressure will be linear. The flow rate is primarily limited by a laminar friction. A flow law is obtained, which is similar to the Hagen-Poiseuille law. If the diameter of the opening 16 is much larger than the length of the opening, the flow conditions are similar to a friction-free flow out of an orifice, a flow dependence, which depends on the square root of the pressure difference across the flow resistor, being obtained in this case according to the Torricelli law.

In any case, the flow through the flow restriction is a monotonously increasing function of the pressure drop across the flow restriction. Hence, a calibration is possible, the flow being determinable by measuring the pressure drop. The chip is therefore suitable for proportioning fluids, i.e. gases and liquids.

Every flow medium has its viscosity n(T), which depends on the temperature, as a characteristic property. It follows that, especially in cases where a quantitative flow measurement is to be carried out, it will be advantageous to integrate a temperature sensor on the chip. The temperature of the flow medium can then be detected by the sensor. Furthermore, it will be advantageous to know the function n(T) for a specific flow medium. On the basis of the temperature detected and the function n(T), a controllable pressure transducer of a proportioner can then be readjusted in response to a temperature variation so as to keep the flow constant at a specified proportioning rate.

Proportioners operating according to the overpressure principle, for which the proportioning element according to the present invention can be used, frequently comprise pressure transducers for producing an overpressure. For proportioning purposes according to the overpressure principle, an overpressure in the order of 50 kPa is frequently used. It is apparent that, when an overpressure in this order of magnitude is used, the pressure sensor should be adapted to this pressure.

If chemically aggressive flow media are to be proportioned, areas of the semiconductor chip which are exposed to the medium to be proportioned can be provided with a passivation layer. In particular, it will be advantageous to provide conductor paths on the front of the pressure sensor with a passivation of this kind.

In the following, exemplary orders of magnitude for the proportioning element according to the present invention will be indicated in brief. The lateral dimensions of the pressure sensor membrane 12 preferably range from 2×2 mm$^2$ to 5×5 mm$^2$. The membrane thickness preferably ranges from 20 μm to 60 μm. The diameter of the opening 16 can e.g. range from 10 μm to 100 μm. As has been explained above, a plurality of openings 16 can be arranged in the membrane 12.

In the following, it will be described how an alarm signalling device can output an alarm on the basis of the signals outputted by the pressure sensor 14, if malfunctions, e.g. leaks or clogging, occur in a proportioner including the proportioning element according to the present invention. Such an alarm can be a live-safing function, e.g. in the field of the medicament dosing.

A first malfunction which may occur is a failure of the pressure transducer. If the pressure transducer fails, no fluid or only a very small amount of fluid will flow through the opening of the membrane. The flow of a small amount of fluid can e.g. be caused by a hydrostatic pressure resulting from the difference in height between a reservoir containing the medium and an output of the proportioner. Hence, there is no or only a very low pressure drop across the pressure sensor, an alarm function being in this case triggered by an alarm signalling device which can be integrated e.g. in a control device of the proportioner.

Other malfunctions can be caused by leaks in flow passages before and after the flow resistor when seen in the direction of flow. If a leak is located before the flow resistor, i.e. on the high-pressure side, the resultant change of flow will also be detected by the differential pressure measurement, since the amount of fluid flowing through the proportioning chip is now smaller. A leak after the flow resistor, when seen in the direction of flow, i.e. on the low-pressure side, is, however, much less likely. Such a leak cannot be detected by the proportioning chip. As a safety measure, the proportioning chip should therefore be arranged at the smallest possible distance from the proportioning outlet of the proportioner, e.g. at the cannula, and it should be attached by means of the least possible number of connectors of the best possible quality.

A further malfunction can be caused by clogging of the flow passage before or after the flow resistor. In the case of medicament dosing, for example, a cannula attached to the patient will often clog after some time so that the proportioning function is no longer guaranteed. If the flow passage clogs before or after the flow resistor, e.g. in a filter or in the cannula, a flow of fluid will no longer take place so that a pressure drop across the pressure sensor will no longer exist. An alarm function can therfore be triggered in this case.

It is also possible that the flow resistor of the proportioning chip itself clogs, the flow resistor being formed by the opening in the membrane. The whole pressure drop then exists across the proportioning chip, i.e. across the membrane. Normally, the pressure drop across the proportioning chip is, however, much larger than the pressure drop across the rest of the proportioner, e.g. hoses, connectors, filters or cannulas of the proportioner. Hence, it will not be possible to differentiate between the small, measured increase in pressure occurring when the restriction clogs and the increase in pressure resulting from a temperature increase of the flow medium in the case of liquids, or a from a temperature decrease of the flow medium in the case of gases. In the case of liquids the viscosity decreases as the temperature increases, which has the effect that the flow and, consequently, the pressure rise increases, whereas in the case of gases the viscosity decreases as the temperature decreases. If triggering of an alarm function is also desired in such cases of clogging of the flow resistor in the membrane, additional measures are required.

A first measure is that two proportioning chips of the above-described kind are arranged in succession. During normal operation, approximately half the proportioning pressure drop then exists across each of the two identical chips. If the opening of one of the two proportioning chips clogs, the whole pressure drop will exist across this proportioning chip, whereas no pressure drop will exist across the other chip. The clogging of the flow resistor, i.e. of the opening, can therefore be measured reliably. By means of such an arrangement of two successive proportioning chips, it is also possible to measure a partial blocking of a flow resistor, since the ratio of the two pressures then shifts away from 1:1. A disadvantage is, however, the higher expenditure, since two chips are required, and since the expenditure for system control will be higher as well.

A further possibility of recognizing clogging in a flow resistor is offered when a proportioning chip and a passive flow resistor are arranged in succession. When a passive flow resistor is arranged in series with the proportioning chip, before or after the proportioning chip when seen in the direction of flow, the flow resistance in the case of nominal flow being equal to that of the proportioning chip, half the proportioning pressure drop will exist across the proportioning chip and the other half of the proportioning pressure drop will exist across the passive flow resistor during normal operation. If the flow resistor of the proportioning chip is clogged, the pressure drop across the flow resistor will double, and this will be recognized by the system control as an alarm case, provided that the pressure drop does not fall within the pressure range given in the case of pressure control due to the change of viscosity caused by a temperature variation. If this pressure increase to a value that is twice as high does not suffice, it will also be possible to increase the ratio of the flow resistances of the passive flow resistor and of the flow resistor of the proportioning chip. Elements which are suitable to be used as passive flow resistors are e.g. glass capillaries, microchannels or holes etched in silicon.

It follows that the present invention provides proportioning elements as well as proportioners making use of these elements in the case of which the pressure difference is determined directly by a sensor, instead of being determined by two pressure measurements relative to the atmosphere, the results of these two pressure measurements being then subtracted from one another. In addition, only a single chip is required according to the present invention, the chip fulfilling both the function of differential pressure measurement and the function of flow restriction, since the restriction is directly integrated in the pressure sensor.

What is claimed is:

1. A proportioning element (10) for proportioning a fluid flow (φ) from an input side to an output side of said proportioning element (10), comprising the following features:

a membrane (12) provided with at least one opening (16) acting as a flow resistor for a medium to be proportioned; and a pressure sensor (14) integrated in the membrane (12) and used for detecting a pressure difference between the input side and the output side of the proportioning element (10), wherein the proportioning element is implemented as a semiconductor chip, the membrane (12) being a semiconductor membrane, and wherein areas of the semiconductor chip which are exposed to the medium to be proportioned are provided with a passivation layer.

2. A proportioning element according to claim 1, wherein conductor paths on the front of the membrane, when seen in the direction of flow, are provided with a passivation layer.

3. A proportioning element according to claim 1 or 2, which additionally comprises a temperature sensor for detecting the temperature of the medium to be proportioned.

4. A proportioning element according to one of the claims 1 to 3, wherein the pressure sensor (14) is defined by piezoresistive resistors arranged on or in the membrane.

5. A proportioning element according to claim 3, wherein the temperature sensor is integrated on the semiconductor chip.

6. A proportioner including a proportioning element (10) according to one of the claims 1 to 5, comprising a pressure transducer for input-side application of a pressure to the medium to be proportioned.

7. A proportioner according to claim 6, wherein said pressure transducer is a controllable pressure transducer, said proportioner including additionally a control device for controlling the controllable pressure transducer in dependence upon the pressure difference detected by means of the pressure sensor (14) and/or the temperature detected by means of the temperature sensor.

8. A proportioner according to claim 6 or 7, comprising in addition an alarm signalling device for outputting an alarm if flow passages arranged before and/or after the membrane have a leak or are clogged or if the at least one opening (16) of the membrane (12) is clogged.

9. A proportioner according to one of the claims 6 to 8, wherein the proportioning element (10) is arranged in the proportioner close to a proportioning outlet of said proportioner.

10. A proportioner according to one of the claims 6 to 9, wherein two proportioning elements (10) according to one of the claims 1 to 6 are arranged in succession so as to permit, on the basis of the pressure drop across the membranes (12) of the two proportioning elements (10), the detection of clogging or blocking of the respective flow resistor provided in said membranes (12).

* * * * *